United States Patent
Sanchez

(10) Patent No.: US 7,340,250 B2
(45) Date of Patent: Mar. 4, 2008

(54) METHOD FOR CHOOSING A NETWORK ELEMENT OF MOBILE TELECOMMUNICATION NETWORK

(75) Inventor: Raquel Sanchez, Malaga (ES)

(73) Assignee: Nokia Corporation, Espoo (FI)

( * ) Notice: Subject to any disclaimer, the term of this patent is extended or adjusted under 35 U.S.C. 154(b) by 236 days.

(21) Appl. No.: 10/646,779

(22) Filed: Aug. 25, 2003

(65) Prior Publication Data
US 2004/0235473 A1 Nov. 25, 2004

(30) Foreign Application Priority Data
May 22, 2003 (EP) .................................. 03011663

(51) Int. Cl.
*H04Q 7/20* (2006.01)
(52) U.S. Cl. ................... 455/433; 455/453; 370/221; 370/338; 709/226
(58) Field of Classification Search ................ 455/433, 455/453; 370/221, 338; 709/226
See application file for complete search history.

(56) References Cited

U.S. PATENT DOCUMENTS 6,091,953 A * 7/2000 Ho et al. ..................... 455/433

2001/0030941 A1* 10/2001 Musikka et al. ............. 370/221
2003/0076803 A1* 4/2003 Chuah ......................... 370/338
2003/0195962 A1* 10/2003 Kikuchi et al. .............. 709/226
2005/0054348 A1* 3/2005 Turina et al. ................ 455/453

FOREIGN PATENT DOCUMENTS

WO WO 02/065802 A1 8/2002
WO WO 02/071776 A1 * 9/2002

OTHER PUBLICATIONS

Tuexen M. et al., "RFC 3237: Requirements for Reliable Server Pooling", Jan. 2002; pp. 1-10, XP002297137.

* cited by examiner

*Primary Examiner*—Joseph Feild
*Assistant Examiner*—Pierre-Louis Desir
(74) *Attorney, Agent, or Firm*—Squire, Sanders & Dempsey L.L.P.

(57) ABSTRACT

A mobile telecommunication network has a server pool having a plurality of network elements, all of which provide a same predetermined service, a pool handle, wherein the pool handle is a name, which identifies the server pool, and a name server for handling requests from a pool user to the server pool, wherein the name server is adapted to identifying a request to the server pool by means of the pool handle and selecting according to predetermined criteria the network elements for providing the predetermined service.

39 Claims, 5 Drawing Sheets

METHOD FOR CHOOSING A NETWORK ELEMENT OF MOBILE TELECOMMUNICATION NETWORK

BACKGROUND OF THE INVENTION

1. Field of the Invention

The present invention relates to a method for choosing a network element of a mobile telecommunication network from a plurality of network elements in order to provide a predetermined service and a mobile telecommunication network which is adapted to executing the method.

2. Description of the Related Art

A mobile telecommunication network includes a radio access network (RAN), a core network (CN) and user equipment (UE). The core network is responsible for switching and routing calls and data connections to external networks. The radio access network handles all radio-related functionalities. The user equipment is the interface between a user and the mobile telecommunication network.

A mobile telecommunication network must provide for a paging functionality. To this end a paging channel (PCH) is established. The paging channel is a downlink transport channel that carries data relevant to the paging procedure, i.e., when the network wants to initiate communication with a terminal. The simplest example is a speech call to the terminal.

The radio access network (RAN) is composed of nodes B, respectively base stations, and radio network controllers (RNC). A predetermined number of base stations are connected to a single radio network controller. The radio network controller (RNC) owns and controls the radio resources and its domains (the base stations connected to the RNC). The radio network controller (RNC) is at the same time the service access point for all services, which the radio access network (RAN) provides to the core network (CN). The base stations interface with the user equipment. The base stations are basically radio transceivers, which are distributed across the territory, in which mobile telecommunication services are to be provided. The user equipment normally corresponds to a mobile telephone. Due to the limited range of the base stations, the user equipment may only communicate with a selected number of base stations within its range.

In order to communicate with the user equipment, the location area must be known. The location area is a grouping of adjacent base stations. If the mobile telecommunication network did not have information about the position of the user equipment, then a paging message would have to be transmitted by all the base stations in order to ensure communication with the user equipment. Thanks to the location areas, the mobile communication network knows the position of the user equipment with reasonable precision and therefore the paging message must be transmitted only by a small group of base stations. Whenever the location area (LA) of user equipment changes, this change must be signaled to the network via a location update procedure. The location area is registered within the mobile services switching center/visitor location register (MSC/VLR) for circuit switched connections and the routing area (RA) is registered in the serving GPRS support note (SGSN) for packet switched communication. The MSC/VLR and the SGSN form part of the core network of the mobile telecommunication network. Each SGSN and each MSC/VLR are connected to several radio network controllers (RNC). For packet switched connections information is transmitted via the SGSN to the radio access network (RAN). For circuit switched connection the MSC/VLR is responsible for transmitting messages to the radio access network. The SGSN or the MSC/VLR selects the radio network controller (RNC) and the associated base stations for transmitting the paging message to the user equipment using the mapping of the location area and the user equipment.

The paging procedure, according to the state of the art, has several drawbacks, in particular the SGSN and MSC must perform many tasks for paging. Consequently, the MSC and SGSN are very complex. The SGSN or MSC need to know in advance the configuration of the network. The core network elements SGSN and MSC need to be able to select the radio network controllers for paging a message. Any changes to the network, in particular adding or removing radio network controllers (RNC), require changes to the SGSN and MSC. In order to coordinate paging for circuit switched (CS) and packet switched (PS) services an additional interface (Gs interface) between the SGSN (Serving GPRS Support Node) and the MSC (Mobile Switching Centre) has to be defined. Paging coordination means that the network sends paging messages for CS services on the same channel as used for PS services and vice versa. Furthermore, a mapping between the user equipment and the radio network controllers (RNC) connected to the SGSN or MSC has to be provided within the SGSN or MSC. The SGSN or MSC must be able to choose the appropriate RNC using the mapping.

SUMMARY OF THE INVENTION

The invention seeks to provide a method for choosing a network element, in particular a radio network controller (RNC) of a mobile telecommunication network and a mobile telecommunication network, that overcome the previously mentioned drawbacks.

The problem is solved by the method for choosing the network element of a mobile telecommunication network from a plurality of network elements as described below. The method include the step of choosing a server pool. A server pool is defined as a set of pool elements (PEs) providing the same application functionality. The server pool according to the invention has a plurality of network elements, all of which provide a same predetermined service. The pool elements of the server pool are the network elements. The radio network controllers (RNC) may be chosen to be the network elements constituting the server pool. The predetermined service is for example the transmission of a paging message to a predetermined user element. The second step includes defining a pool handle. A pool handler is a name, which identifies a particular server pool. Finally a name server is provided for handling requests from a pool user to the server pool. A pool user is a network element such as an SGSN, which wishes to access a pool element of the server pool. The name server identifies a request to a particular server pool by means of the pool handle. The name server selects one of the network elements or plural network elements of the server pool according to predetermined algorithm. The selected network elements are chosen to provide the predetermined services to the pool user.

The pool user, in particular the SGSN, only needs the pool handle and the service to be provided by the pool handle in order to access a pool element. Therefore less intelligence is required in the pool user. The pool user in particular the SGSN does not need to know in advance the configuration of the network. It just uses a pool handle. The SGSN or the MSC do not need to store a mapping between the user equipment and the radio network controllers (RNC) in order to transmit a paging message. The network may provide coordination of paging for circuit switch (CS) and packet switch (PS) services. The mobile station need only monitor the channels. Paging coordination need not be managed in the CN, it may be managed in the name server. Therefore, new procedure definitions are not necessary for the coordination of PS services when having active CS services. The name server selects the radio network controller.

The pooling mechanism according to the invention is centralized. The name server carries out the selection and control of the pool elements. If multiple pool elements may provide the same service the server pool may be used to provide fault tolerance or load sharing. For example, if several radio network controllers (RNC) can transmit a paging message to user equipment (UE), then the name server may choose the radio network controller (RNC) in response to a paging request, which is idle or carries the least load. This is called load sharing. As a consequence the capacity of the network may be used efficiently.

Preferably the reliable server pool protocol (RSer Pool Protocol) according to the Internet engineering task force (IETF) is used. The RSer pool protocol is a combination of two protocols: ENRP (end point name resolution protocol) and ASAP (aggregate server access protocol). The name servers use the end point name resolution protocol (ENRP) for communication with each other to make sure that all have the same information about the server pool. ENRP is designed to provide a fully distributed fault-tolerant realtime translation service that maps a name to a set of transport addresses pointing to a specific group of network communication endpoints registered under that name. ENRP employs a client-server model, with which the name server will respond to the name translation service requests from endpoint clients running on the same host or running on different hosts.

It is also required according to the Rser Pool Protocol, that the name servers do not resolve a pool handle to a transport layer address of the pool element which is not in operation. Therefore one specific name server called the home name server of the pool element supervises each pool element. If it detects that the pool element is out of service all other name servers are informed by using ENRP.

According to the Rser Pool Protocol, the pool user wanting service from the pool uses the aggregate service access protocol (ASAP) to access members of the pool. Depending on the level of supported desired by the application, use of ASAP may be limited to an initial query for an active pool element, or ASAP may be used to mediate all communication between the pool user and the pool elements, so that automatic fail over from a failed pooled element to an alternate pool element can be supported. ASAP in conjunction with ENRP provides a fault tolerance data transfer mechanism. ASAP uses a name-based addressing model, which isolates a logical communication endpoint from its IP address, thus effectively eliminating the binding between communication endpoint and its physical address, which normally constitutes a single point of failure. In addition, ASAP defines each logical communication destination as a server pool, providing full transparent support for server pooling and load sharing.

ASAP is also used by a server to join or leave a server pool. It registers or deregisters itself by communicating with a name server, which will normally be the home name server. ASAP allows dynamic system scalability, allowing the pool member ship to change at any time without interruption of the service.

According to the Rser Pool Protocol, the pool element-name server communication is used for doing name queries. A pool user sends a pool handle to the name server and gets back the information necessary for accessing a server pool. The pool element-name server communication is used for registration and deregistration of the pool element in one or more pools and for the supervision of the pool element by the home name server. This communication is based on the stream control transmission protocol (SCTP).

The name server may identify the user equipment (UE), which constitute the server pool, by user equipment identification such as a temporary identity of the user equipment (TMSI) or a subscriber identity stored on a subscriber identity module (SIM) associated with the user equipment. Since these identifications are commonly used in mobile communication networks, it is preferably to use them for identifying pool elements.

In order to process a paging request, the name server (NS) accesses a location area (LA) or a routing area (RA). The location area and the routing area indicate the area in which the user equipment is currently locate. The term location area (LA) is used in the circuit switched domain; the term routing area (RA) is used in the packet switched domain. The location area is used by the name server for selecting a radio controller, which may transmit a paging message to predetermined user equipment. The name server chooses the radio controller for transmitting the paging message. Therefore the SGSN and MSC may be relieved from these tasks. Less intelligence is required for these core network components. The pool is addressed like a single unit using a pool handle.

Preferably the name server checks whether the predetermined user equipment is signed to a particular radio controller. An assignment between the user equipment and a radio controller exists, if the radio controller and the user equipment are connected to each other via a dedicated transport channel. This may be the case, if a real time application such as a regular telephone call is carried out. In this case the particular radio controller connected to the user equipment may be used for paging. The name server comprises a dynamic register, which stores a mapping between the assigned user equipment and radio controllers. The mapping has to be updated whenever an assignment is begun or terminated.

If several radio controllers are used for transmitting a paging message to the user equipment, the name server selects the radio controller for paging according to a predetermined algorithm. Preferably the algorithm optimizes the load sharing between the radio controllers. The algorithm may also be designed for optimizing the quality of connection. If one of the radio controllers capable of transmitting the paging message to the user equipment is out of order, being repaired or provides for a bad quality of connection, the algorithm may exclude this radio controller from transmitting the paging message.

The name server may also create a ranking list of the radio controllers capable of transmitting a paging message to the predetermined user equipment. The order of the radio controllers within the ranking list determines which of the radio controllers is most favorable to perform paging. The ranking list is transmitted to the SGSN or MSC, which is requesting to transmit a paging message to one of the user equipments. Initially paging is performed via the radio controller mentioned first in the ranking list. If paging fails, the radio controller named a second in the ranking list is used for paging and so on.

The paged user equipment sends a paging response to the radio controller. In response to receiving a paging response, the radio controller establishes a transport channel between the user equipment and itself. So the notification of the name server may also indicate that a connection has been established between the predetermined user equipment and the selected radio controller, e.g., for paging coordination purposes.

The name server may store a mapping between the predetermined user equipment and the selected radio controllers, which have established a connection. The mapping is updated, whenever the name server receives information from the radio controller indicating that a new connection has been established. Whenever a connection between the predetermined user equipment and the selected radio controllers is terminated, this information is transferred to the name server by the radio controller. In response the name server updates the mapping accordingly. Preferably the name server stores two different mappings. One mapping for connections between the predetermined user equipment and the selected radio controller for connections in a circuit switch domain and the other mapping for packet switched domain connections.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
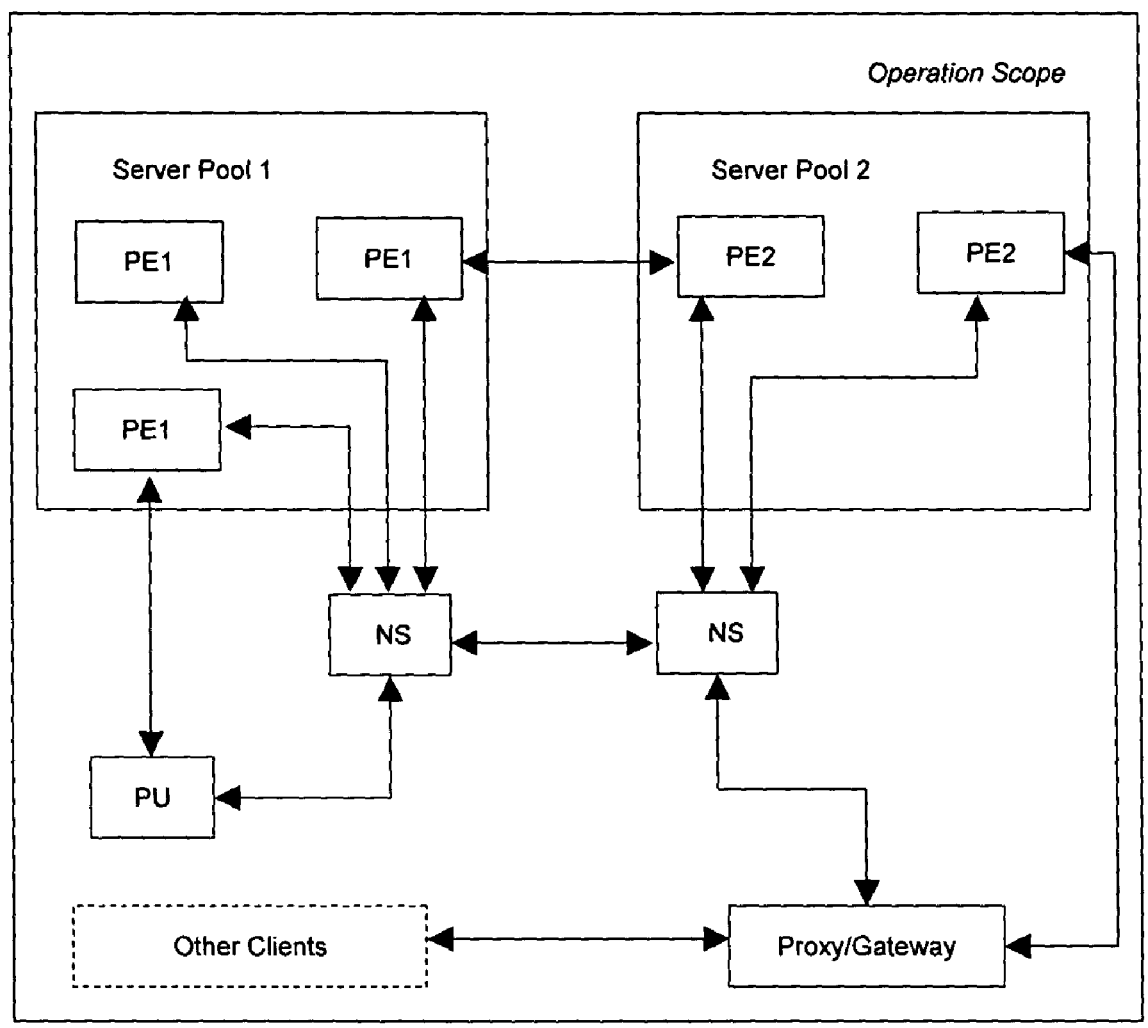
FIG. 1 shows a schematic representation of the pooling architecture used in the embodiments of the present invention.

FIG. 1 shows the pool architecture used in examples of the present invention. The pool elements PE1 and the pool elements PE2 each constitute a pool. A name server NS is connected to each element of a pool. The name server is addressed with a pool handle. In response the name server determines according to a predetermined algorithm, which pool element serves the pool user.

Figure 2:
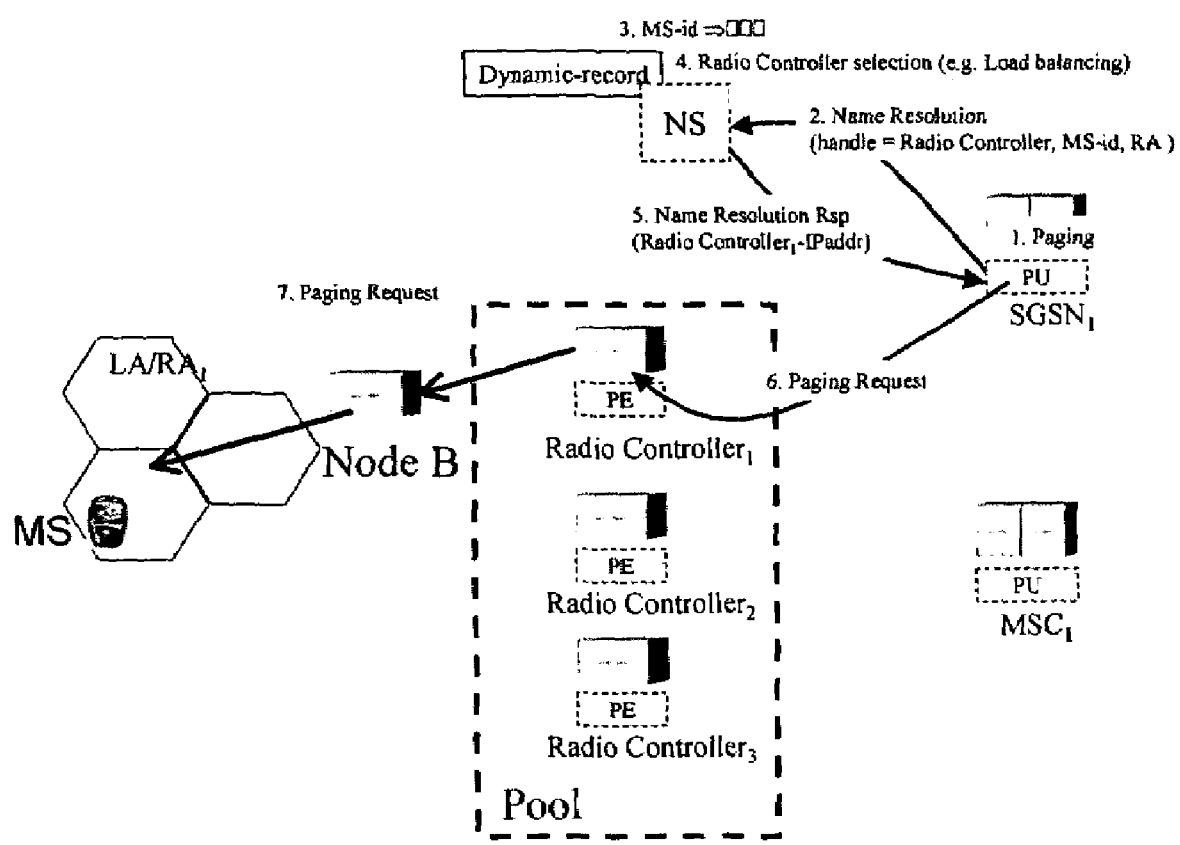
FIG. 2 shows a schematic representation of a pooling architecture according a first embodiment of the invention and indicates how a paging request is handled.

In FIG. 2 a pool is depicted. The pool elements PE are Radio controllers 1, 2 and 3. The pool user is a serving GPRS support node SGSN1. Furthermore a name server NS is provided. The task to be performed by the pool is to transmit a paging request to a mobile station in a certain routing area RA. A mobile services switching center MSC1 is depicted. The first embodiment is an implementation of a pool in a UMTS network. The paging request is a request in the packet switched domain. The mobile services switching center MSC1 is part of the circuit switched domain of the network and does not take part in the paging request in the packet switched domain.

Initially the serving GPRS support node SGSN1 addresses the name server with the name handle and transmits the identification of the mobile station to be paged (Ms-id) to the name server and the routing area (RA) where the user equipment (UE) is allocated. Mobile Station identification and routing area identification have to be added to ASAP. The aggregate server access protocol (ASAP) may be used to identify the radio controller for processing the paging request. There is a first record, which associates radio network controllers (RNC) to a routing area (RA) and location area (LA).

There is a second dynamic record of the radio network controllers (RNC) controlling the user equipment (UE) having a PS/CS connection. The second dynamic record may be used for paging coordination purposes. The second dynamic record can be allocated as part of the name server or as a separate functionality. A dynamic record is a look up table, which is continuously being updated. In response to the request, the name server selects the radio controller, which may fulfill the paging request. If the mobile station MS is already connected to a radio controller in the circuit switched domain, then this radio controller is chosen for transmitting the paging message.

In FIG. 2 no circuit switched connection exists. Therefore, the name server is chosen according to the first record (location area look up table). The name server sends the identification (IP-address) of the selected radio controller1 (Radio controller1-Ipaddr) to the serving GPRS support node SGSN1. Hereupon the serving GPRS support node sends the paging request to the radio controller1. The radio controller1 transmits the paging request to the mobile station.

Figure 3:
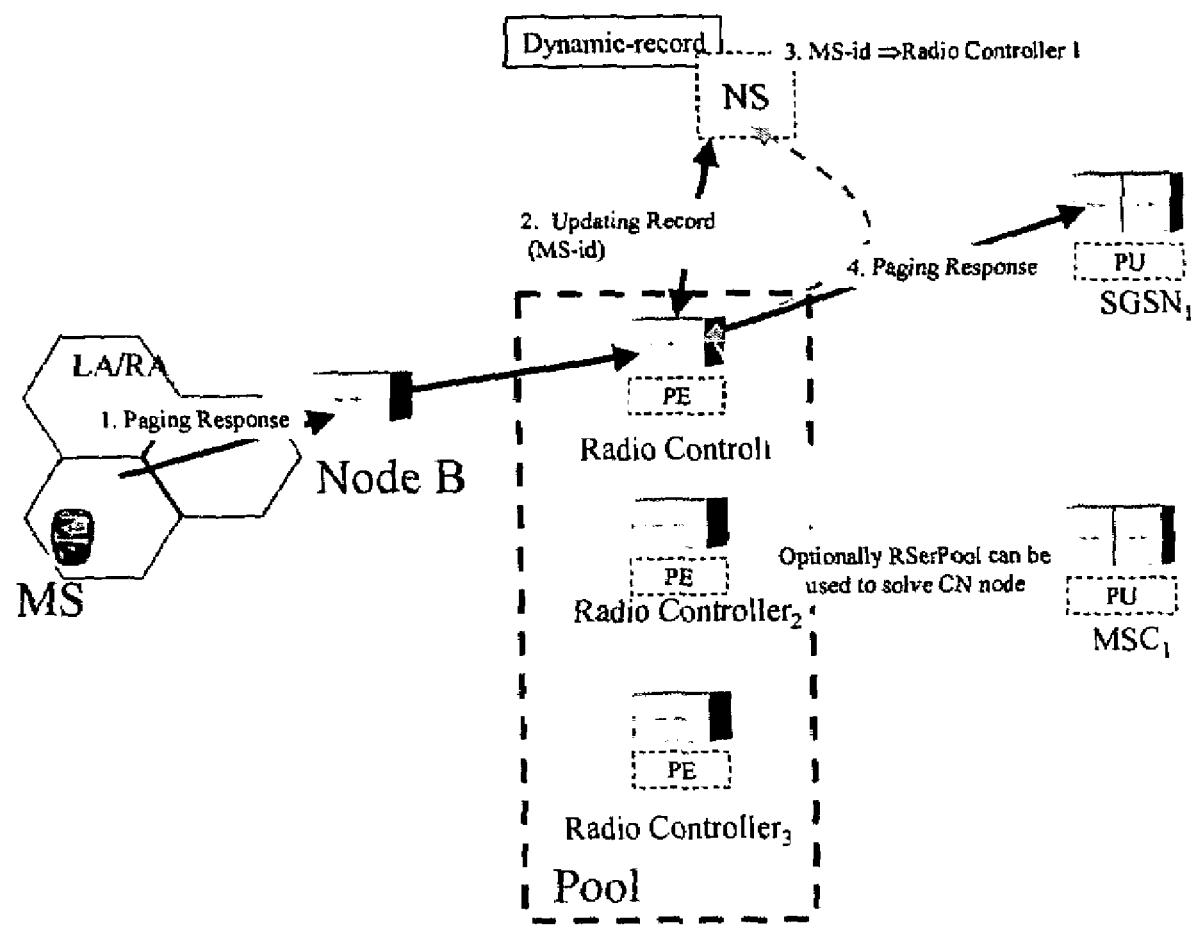
FIG. 3 shows the pooling architecture according to the first embodiment and additionally indicates how a connection is established.

FIG. 3 shows how a connection is established in response to the paging request. The mobile station sends a paging response via a node B back to the Radio controller1. Then the radio controller sends the identification of the mobile station (Ms-id) to the name server NS. The name server NS is thereby notified, that a connection between the radio controller1 and the mobile station MS is established. The name server stores this information in the second dynamic record for paging coordination purposes. Thereupon the paging response is transmitted to the serving GPRS support node SGSN1.

Figure 4:
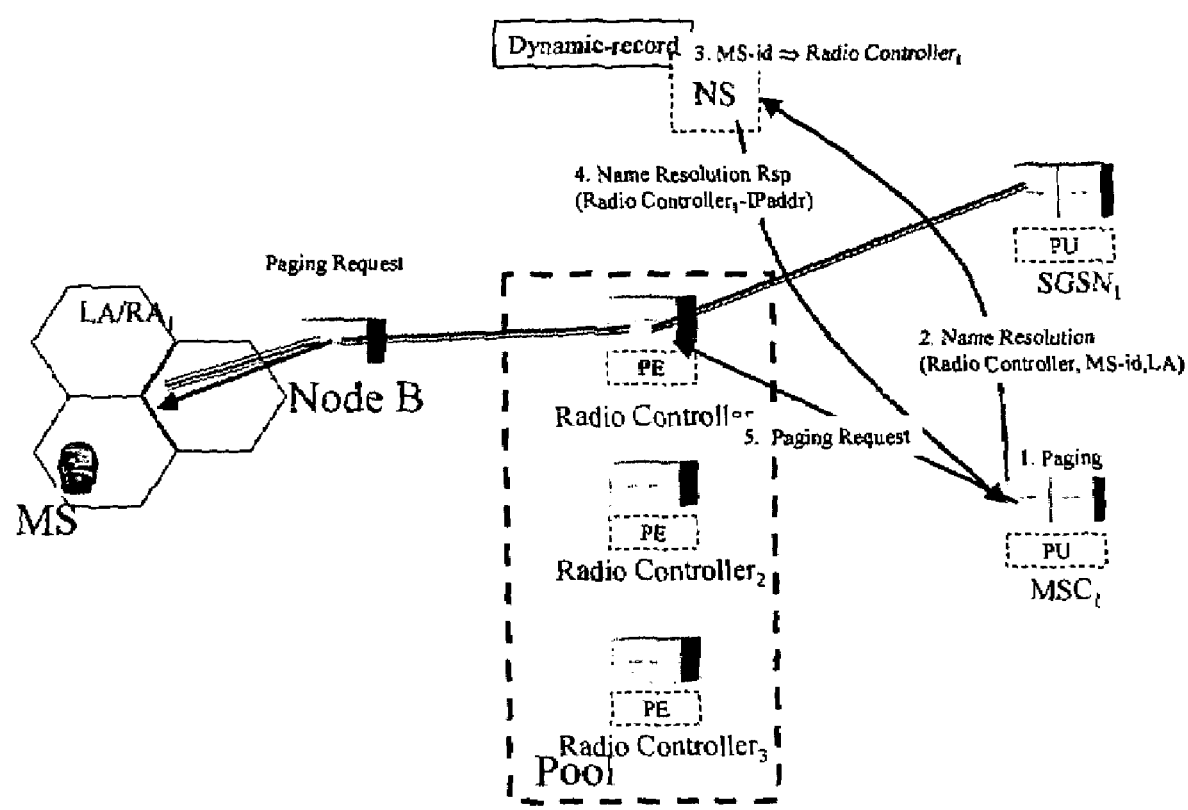
FIG. 4 shows a pooling architecture according to the first embodiment and additionally indicates how a paging request is processed, if a connection to the user equipment has been established.

FIG. 4 shows, how a paging request from the mobile services switching center MSC1 is transmitted to the mobile station MS. A connection between the mobile station MS, the radio controller1 and the serving GPRS support node SGSN1 has been established. The mobile services switching center MSC1 addresses the name server NS using the pool handle and transmits the identification (Ms-id) of the mobile station to be paged to the name server NS and the location area (LA) where the Mobile station (MS) is located. The name server detects in the second dynamic record that the mobile station MS is connected to the radio controller1. Therefore, the name server sends the IP-address (Radio Controller1-Ipaddr) of the radio controller1 to the MSC1. Thereupon the mobile services switching center MSC1 sends the paging request via the radio controller1 to the mobile station MS and paging coordination is achieved.

Figure 5:
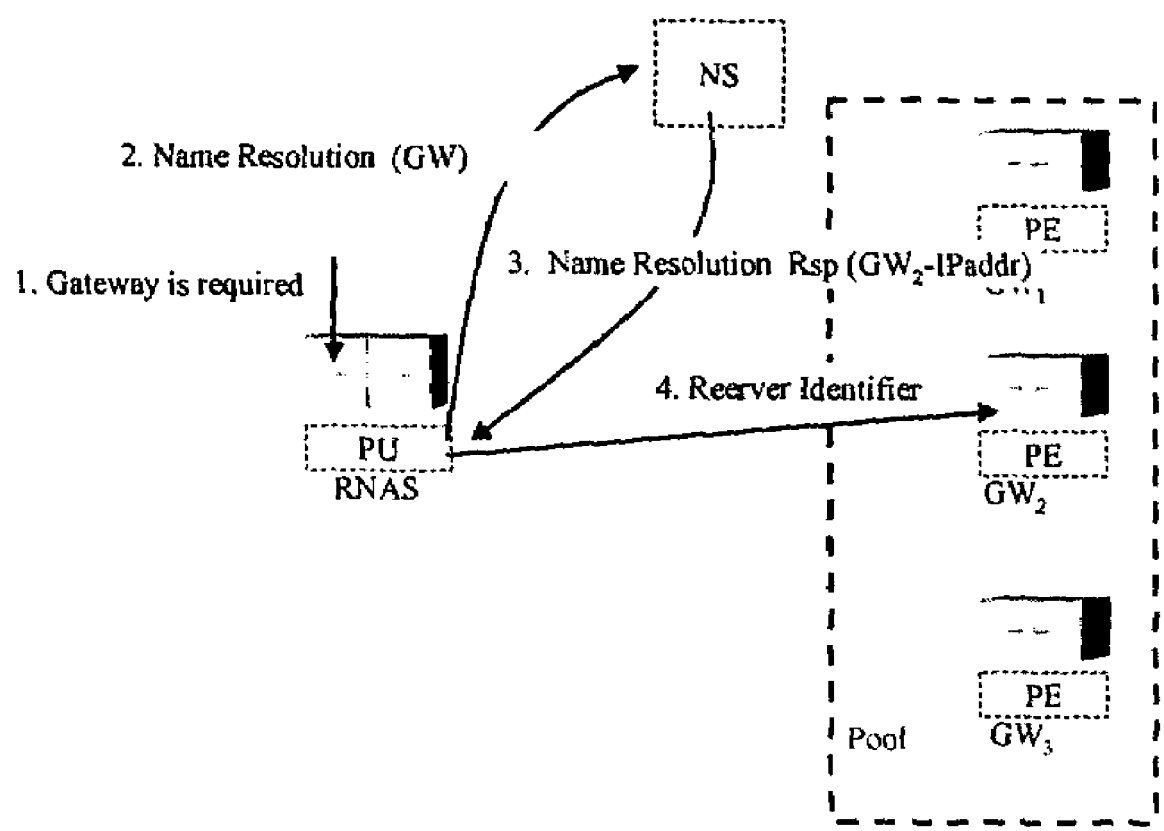
FIG. 5 shows a particular pooling architecture according to a second embodiment.

FIG. 5 shows the implementation of a pool in a mobile telecommunication network according to the IP RAN architecture. IP RAN stands for a radio access network based on an Internet protocol. The IP RAN architecture is composed basically of the entities discussed below.

A first entity is the IP BTS (IP Base station). In addition to the layer 1 processing, the IP BTS includes the processing of the radio protocols. The IP base station may be viewed as a small radio network controller/base station controller connected with an Iu-like interface with the RAN access server (RNAS) and connected with an Iur-like interface to other IP base stations. The RAN common server for performing RAN-wide functionality that cannot be located in the base station site. The RAN access gateways comprising the RAN access server (RNAS), the RAN gateway (RNGW) and the circuit switched gateway (CSGW). The RAN access gateways are the access point to the IP RAN from the core network CN and other radio access networks.

The radio network gateway RNGW performs transport functions, in particular relaying GTP packets. GTP packets are information packets encoded according to the GPRS tunneling protocol. The CSGW is the gateway for circuit switched connections.

The RAN access server (RNAS) acts as a signaling gateway between the IP RAN and the core network CN: The RNAS processes the idle mode paging messages and other connectionless messages from the core network CN and forwards them to the base station controlling the cell the message is targeted to. The RNAS selects and controls the gateways (RNGW and CSGW) during the connection set up and the relocation of the base stations BS.

In FIG. 5 several gateways GW1, GW2 and GW3 form a pool. The gateways constitute the pool elements PE. They may be RNGW or CSGW gateways. The radio access network server (RNAS) is the pool user. A name server NS is depicted in FIG. 5. Whenever the selection of a gateway in the pool is needed, the RAN access server RNAS asks the name server NS for a gateway GW of the pool to be used. The RNAS passes the pool handle of the name server NS, which is being required. The name server NS selects a gateway GW of the pool according to any predetermined algorithm (e.g. an algorithm for load sharing or service balancing). The name server is able to select a suitable gateway based on any criteria. Thereafter the name server returns the IP address of the selected gateway to the RNAS. The RNAS sends a request to the selected gateway. A prioritized list of possible gateways GWs may also be sent to the RNAS in order to improve the resilience of the network. If the first gateway in the list is not reachable, the second gateway is addressed by the RNAS.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method comprising:
choosing a server, the server comprising the plurality of network elements of the mobile telecommunication network, all of which provide the same predetermined service,
handling any request from a pool user to the identified server, wherein the name server identifies a request to the identified server by a pool handle, establishes a connection with each network element of the identified server, and selects according to predetermined criteria at least one network element amongst the plurality of network elements of the identified server for providing the predetermined service requested by the pool user, wherein the plurality of network elements are radio network controllers, the request to be handled is a paging request from a core network element acting as the pool user, and the predetermined service to be provided is transmitting a paging message from the pool user to a predetermined user equipment directly through the selected at least one network element.

2. The method according to claim 1, wherein the radio network controllers are according to the universal mobile telecommunications system (UMTS) standard, and the core network element is one of a mobile services switching center and a serving general packet radio service (GPRS) support node.

3. The method according to claim 2, wherein the name server identifies the predetermined user equipment by an user equipment identification, which is one of a temporary identity of the predetermined user equipment and a subscriber identity stored on a subscriber identity module associated with the predetermined user equipment.

4. The method according to claim 2, wherein the name server accesses a location area or a routing area, which indicates the area in which the predetermined user equipment is currently located, and selects a radio controller which is close enough to the predetermined user equipment for transmitting the paging message to the predetermined user equipment.

5. The method according to claim 2, wherein the name server checks whether the predetermined user equipment is assigned to a particular radio controller and selects the particular radio controller for paging.

6. The method according to claim 2, wherein the name server further selects according to a predetermined algorithm one radio controller from the radio controllers, which are capable of transmitting a paging message to the predetermined user equipment.

7. The method according to claim 6, wherein the one radio controller is selected using an algorithm for balancing loads of the radio controllers.

8. The method according to claim 6, wherein the name server creates a ranking list of the radio controllers capable of transmitting a paging message to the predetermined user equipment, wherein a first radio controller in the list is a most favorable to perform paging and a last radio controller in the list is a least favorable to perform paging.

9. The method according to claim 8, wherein an identity of the selected radio controller or the ranking list of the radio controllers is sent to the core network elements acting as the pool user.

10. The method according to claim 2, wherein the radio controller sends information to the name server containing an identification of the selected radio controller and of the predetermined user equipment after having performed paging to the predetermined user equipment.

11. The method according to claim 2, wherein the name server stores a mapping between the predetermined user equipment and the selected radio controllers.

12. The method according to claim 11, wherein the name server stores a mapping between the predetermined user equipment and the selected radio controller for both a circuit switched domain and a packet switched domain of the mobile telecommunication network.

13. The method according to claim 11, wherein the mapping between the predetermined user equipment and the selected radio controllers is updated once a connection between the predetermined user equipment and the selected radio controller is terminated.

14. The method according to claim 1, wherein the plurality of network elements are a plurality of gateway servers of an Internet Protocol based radio access network, wherein the Internet Protocol based radio access network is one of radio access network gateways and circuit switched gateways, and the pool user is a Radio access network access server.

15. The method according to claim 1, wherein the plurality of network elements are network servers serving GPRS support nodes or gateway GPRS support nodes.

16. An apparatus, comprising:
a controller configured to handle requests from a pool user to an identified server, wherein the controller is configured to identify a request to the identified server by a pool handle, to establish a connection with each network element of the identified server, and to select according to predetermined criteria at least one network element amongst a plurality of network elements of the identified server for providing the predetermined service requested by the pool user,
wherein the plurality of network elements are radio network controllers, the request to be handled is a paging request from a core network element acting as the pool user, and the predetermined service to be provided is transmitting a paging message from the pool user to a predetermined user equipment directly through the selected at least one network element.

17. The apparatus according to claim 16, wherein the radio network controllers are according to the universal mobile telecommunications system (UMTS) standard, and the core network element is one of a mobile services switching center and a serving general packet radio service (GPRS) support node.

18. The apparatus according to claim 17, wherein the name server is configured to identify the predetermined user equipment by an user equipment identification, wherein the user equipment identification is one of a temporary identity of the user equipment and a subscriber identity stored on a subscriber identity module associated with the user equipment.

19. The apparatus according to claim 17, wherein the name server is configured to access a location area or a routing area, which indicate the area in which the user equipment is currently located, and selecting a radio controller which is close enough to the user equipment for transmitting a paging message to the predetermined user equipment.

20. The apparatus according to claim 17, wherein the name server is configured to check, whether the predetermined user equipment is assigned to a particular radio controller, and select the particular radio controller for paging.

21. The apparatus according to claim 17, wherein the name server is configured to select according to a predetermined algorithm one radio controller from the radio controllers, which are capable of transmitting a paging message to the predetermined user equipment.

22. The apparatus according to claim 21, wherein the name server is configured to select the one radio controller using an algorithm for balancing loads of the radio controllers.

23. The apparatus according to claim 21, wherein the name server is configured to create a ranking list of the radio controllers capable of transmitting a paging message to the predetermined user equipment, wherein a first radio controller in the list is a most favorable to perform paging and a last radio controller in the list is a least favorable to perform paging.

24. The apparatus according to claim 23, wherein the name server is configured to send the identity of the one radio controller or the ranking list of the radio controllers to the pool user.

25. The apparatus according to claim 16, wherein the radio controller is configured to send information to the name server containing an identification of the selected radio controller and of the predetermined user equipment after having performed paging to the predetermined user equipment.

26. The apparatus according to claim 16, wherein the name server comprises a register for storing a mapping between the predetermined user equipment and the selected radio controllers.

27. The apparatus according to claim 16, wherein the name server has access to a register for mapping between the predetermined user equipment and the selected radio controller for both a circuit switched domain and a packet switched domain of the mobile telecommunication network.

28. The apparatus according to claim 16, wherein the selected radio controller is configured to indicate to the name server that a connection between the predetermined user equipment and the selected radio controller is terminated and the name server is configured to change the mapping between the predetermined user equipment and the selected radio controllers in response to the indication from the selected radio controller.

29. The apparatus according to claim 16, wherein the plurality of network elements are a plurality of gateway servers of an Internet Protocol based radio access network, wherein the Internet Protocol based radio access network is one of radio access network gateways and a circuit switched gateways, the pool user is a Radio access network access server.

30. The apparatus according to claim 16, wherein the plurality of network elements are network servers serving GPRS support nodes or gateway GPRS support nodes.

31. The apparatus according to claim 16, wherein the name server constitutes a core network node such as an serving GPRS support node, a Home location register or a Mobile Services Switching Center.

32. An apparatus, comprising:
name serving means for serving handling requests from a pool user to an identified server, wherein the name serving means is configured to identify a request to the identified server by means of the pool handle, to establish a connection with each network element of the identified server, and to select according to predetermined criteria at least one network element amongst the plurality of network elements of the identified server for providing the predetermined service requested by the pool user,
wherein the plurality of network elements are radio network controllers, the request to be handled is a paging request from a core network element acting as the pool user, and the predetermined service to be provided is transmitting a paging message from the pool user to a predetermined user equipment directly through the selected at least one network element.

33. The apparatus according to claim 32, wherein the radio network controllers are according to the UMTS standard, and the core network element is one of a mobile services switching center and a serving GPRS support node.

34. The apparatus according to claim 32, wherein the plurality of network elements are a plurality of gateway servers of an Internet Protocol based radio access network, wherein the Internet Protocol based radio access network is one of radio access network gateways and circuit switched gateways, and the pool user is a Radio access network access server.

35. The apparatus according to claim 32, wherein the plurality of network elements are network servers serving GPRS support nodes or gateway GPRS support nodes.

36. The apparatus according to claim 16, wherein the apparatus comprises part of a name server.

37. A mobile communication system, comprising:
a server having a plurality of network elements, all of which provide a same predetermined service; and
a name server device configured to handle requests from a pool user to an identified server, to identify a request to the identified server by means of a pool handle, to establish a connection with each network element of the identified server, and to select according to predetermined criteria at least one network element amongst the plurality of network elements of the identified server for providing the predetermined service requested by the pool user,
wherein the plurality of network elements are radio network controllers, the request to be handled is a paging request from a core network element acting as the pool user, and the predetermined service to be provided is transmitting a paging message from the pool user to a predetermined user equipment directly through the selected at least one network element.

38. The system according to claim 37, wherein the radio network controllers are according to the universal mobile telecommunications system (UMTS) standard, and the core network element is one of a mobile services switching center and a serving general packet radio service (GPRS) support node.

39. The system according to claim 37, wherein the plurality of network elements are a plurality of gateway servers of an Internet Protocol based radio access network, wherein the Internet Protocol based radio access network is one of radio access network gateways and circuit switched gateways and the pool user is a radio access network access server.

* * * * *